(12) United States Patent
Kuzumaki et al.

(10) Patent No.: US 12,174,131 B2
(45) Date of Patent: Dec. 24, 2024

(54) QUANTITATIVE ANALYSIS APPARATUS, METHOD AND PROGRAM AND MANUFACTURING CONTROL SYSTEM

(71) Applicant: Rigaku Corporation, Tokyo (JP)

(72) Inventors: Takahiro Kuzumaki, Tokyo (JP); Tetsuya Ozawa, Tokyo (JP); Miki Kasari, Tokyo (JP); Akihiro Himeda, Tokyo (JP); Atsushi Ohbuchi, Tokyo (JP); Takayuki Konya, Tokyo (JP)

(73) Assignee: Rigaku Corporation, Tokyo (JP)

( * ) Notice: Subject to any disclaimer, the term of this patent is extended or adjusted under 35 U.S.C. 154(b) by 432 days.

(21) Appl. No.: 17/831,188

(22) Filed: Jun. 2, 2022

(65) Prior Publication Data

US 2022/0390394 A1 Dec. 8, 2022

(30) Foreign Application Priority Data

Jun. 4, 2021 (JP) ................................. 2021-094383

(51) Int. Cl.
*G01N 23/207* (2018.01)
*G01N 23/2055* (2018.01)

(52) U.S. Cl.
CPC ....... *G01N 23/2055* (2013.01); *G01N 23/207* (2013.01); *G01N 2223/0566* (2013.01); *G01N 2223/306* (2013.01)

(58) Field of Classification Search
CPC ............. G01N 23/2055; G01N 23/207; G01N 2223/0566; G01N 2223/306; G06Q 50/04
See application file for complete search history.

(56) References Cited

U.S. PATENT DOCUMENTS

2020/0173938 A1    6/2020    Toraya et al.

FOREIGN PATENT DOCUMENTS

JP          2009-168584 A      7/2009
WO      WO-2019031019 A1 *    2/2019    ......... G01N 23/2055

OTHER PUBLICATIONS

Translation of WO-2019031019-A1 (Year: 2019).*

* cited by examiner

*Primary Examiner* — David P Porta
*Assistant Examiner* — Mamadou Faye
(74) *Attorney, Agent, or Firm* — ASLAN LAW, P.C.

(57) ABSTRACT

A quantitative analysis apparatus, a method, a program, and a manufacturing control system are provided. A WPPF section 320 for determining parameters of theoretical diffraction intensity by performing whole powder pattern fitting with respect to an X-ray diffraction profile to be analyzed, a scale factor acquiring section 325 for acquiring a scale factor of a test component among the determined parameters, a calibration curve storing section 350 for storing a calibration curve indicating a correlation between scale factors of the test component acquired with respect to a standard sample and content ratios of the test component in the standard sample, and a conversion section 370 for converting the scale factor of the test component acquired with respect to an objective sample into the content ratio of the test component in the objective sample using the stored calibration curve, are comprised.

11 Claims, 13 Drawing Sheets

| SAMPLE No. | ADDED AMOUNT OF LIME (mass%) | SCALE FACTOR 1 | SCALE FACTOR 2 | SCALE FACTOR 3 | SCALE FACTOR 4 | SCALE FACTOR 5 | MEAN VALUE |
|---|---|---|---|---|---|---|---|
| SAMPLE1 | 0.1 | 0.9 | 1.3 | 1 | 1 | 1.1 | 1.06 |
| SAMPLE2 | 0.3 | 3.9 | 4.4 | 4 | 3.8 | 3.8 | 3.98 |
| SAMPLE3 | 0.5 | 6.9 | 6.8 | 6.6 | 6.3 | 6.2 | 6.56 |
| SAMPLE4 | 0.7 | 8.8 | 8.8 | 8.5 | 8.3 | 8.4 | 8.56 |
| SAMPLE5 | 1.0 | 12.8 | 12.6 | 12.6 | 12.3 | 12.3 | 12.52 |
| SAMPLE6 | 2.0 | 25.2 | 24.5 | 24.4 | 24.6 | 24.3 | 24.6 |
| SAMPLE7 | 3.0 | 37 | 37.2 | 36.6 | 37.1 | 36.9 | 36.96 |

FIG. 8A

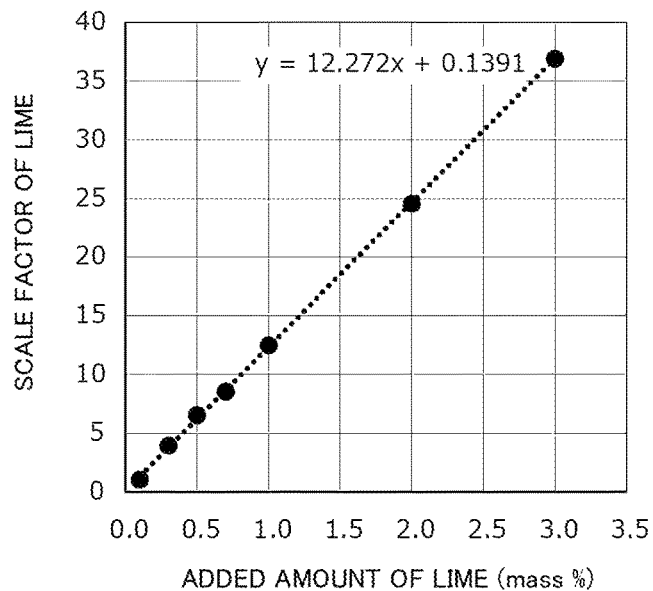

FIG. 8B

| SAMPLE No. | ADDED AMOUNT OF LIME (mass%) | Quantitative Value1 (mass%) | Quantitative Value2 (mass%) | Quantitative Value3 (mass%) | Quantitative Value4 (mass%) | Quantitative Value5 (mass%) | MEAN VALUE (mass%) | |MEAN VALUE − ADDED AMOUNT| (mass%) |
|---|---|---|---|---|---|---|---|---|
| SAMPLE1 | 0.1 | 0.06 | 0.09 | 0.07 | 0.07 | 0.08 | 0.08 | 0.02 |
| SAMPLE2 | 0.3 | 0.31 | 0.35 | 0.31 | 0.30 | 0.30 | 0.31 | 0.01 |
| SAMPLE3 | 0.5 | 0.55 | 0.54 | 0.53 | 0.50 | 0.49 | 0.52 | 0.02 |
| SAMPLE4 | 0.7 | 0.71 | 0.71 | 0.68 | 0.67 | 0.67 | 0.69 | 0.01 |
| SAMPLE5 | 1.0 | 1.03 | 1.02 | 1.02 | 0.99 | 0.99 | 1.01 | 0.01 |
| SAMPLE6 | 2.0 | 2.04 | 1.98 | 1.98 | 1.99 | 1.97 | 1.99 | 0.01 |
| SAMPLE7 | 3.0 | 3.00 | 3.02 | 2.97 | 3.01 | 3.00 | 3.00 | 0.00 |

FIG. 8C

| SAMPLE No. | ADDED AMOUNT OF LIME (mass%) | INTEGRATED INTENSITY1 (counts) | INTEGRATED INTENSITY2 (counts) | INTEGRATED INTENSITY3 (counts) | INTEGRATED INTENSITY4 (counts) | INTEGRATED INTENSITY5 (counts) | MEAN VALUE (counts) |
|---|---|---|---|---|---|---|---|
| SAMPLE1 | 0.1 | 114.5 | 108.51 | 110.25 | 115.43 | 104.44 | 110.63 |
| SAMPLE2 | 0.3 | 188.39 | 194.82 | 199.8 | 184.42 | 178.36 | 189.16 |
| SAMPLE3 | 0.5 | 242.23 | 243.51 | 244.5 | 235.68 | 230.85 | 239.35 |
| SAMPLE4 | 0.7 | 309.28 | 304.75 | 306.59 | 299 | 299.83 | 303.89 |
| SAMPLE5 | 1.0 | 410 | 402.46 | 387.33 | 408.87 | 395.13 | 400.76 |
| SAMPLE6 | 2.0 | 714.86 | 707.7 | 714.13 | 711.76 | 709.42 | 711.57 |
| SAMPLE7 | 3.0 | 1012.23 | 1027.44 | 1022.4 | 1037.01 | 1016.14 | 1023.04 |

FIG. 9A

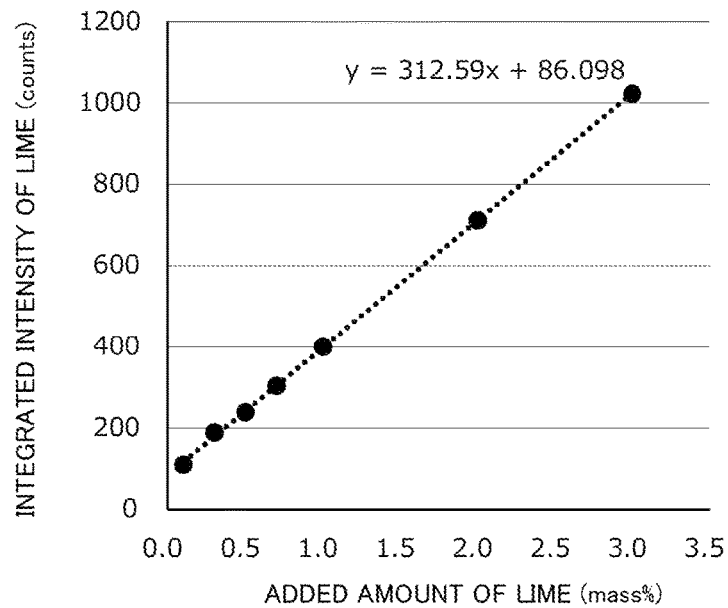

FIG. 9B

| SAMPLE No. | ADDED AMOUNT OF LIME (mass%) | Quantitative Value1 (mass%) | Quantitative Value2 (mass%) | Quantitative Value3 (mass%) | Quantitative Value4 (mass%) | Quantitative Value5 (mass%) | MEAN VALUE (mass%) | \|MEAN VALUE − ADDED AMOUNT\| (mass%) |
|---|---|---|---|---|---|---|---|---|
| SAMPLE1 | 0.1 | 0.09 | 0.07 | 0.08 | 0.09 | 0.06 | 0.08 | 0.02 |
| SAMPLE2 | 0.3 | 0.33 | 0.35 | 0.36 | 0.31 | 0.30 | 0.33 | 0.03 |
| SAMPLE3 | 0.5 | 0.50 | 0.50 | 0.51 | 0.48 | 0.46 | 0.49 | 0.01 |
| SAMPLE4 | 0.7 | 0.71 | 0.70 | 0.71 | 0.68 | 0.68 | 0.70 | 0.00 |
| SAMPLE5 | 1.0 | 1.04 | 1.01 | 0.96 | 1.03 | 0.99 | 1.01 | 0.01 |
| SAMPLE6 | 2.0 | 2.01 | 1.99 | 2.01 | 2.00 | 1.99 | 2.00 | 0.00 |
| SAMPLE7 | 3.0 | 2.96 | 3.01 | 2.99 | 3.04 | 2.97 | 3.00 | 0.00 |

FIG. 9C

| SAMPLE No. | ADDED AMOUNT OF LIME(mass%) | Quantitative Value1 (mass%) | Quantitative Value2 (mass%) | Quantitative Value3 (mass%) | Quantitative Value4 (mass%) | Quantitative Value5 (mass%) | MEAN VALUE (mass%) | \|MEAN VALUE − ADDED AMOUNT\| (mass%) |
|---|---|---|---|---|---|---|---|---|
| SAMPLE1 | 0.1 | 0.09 | 0.13 | 0.1 | 0.1 | 0.11 | 0.11 | 0.01 |
| SAMPLE2 | 0.3 | 0.39 | 0.44 | 0.41 | 0.39 | 0.38 | 0.4 | 0.10 |
| SAMPLE3 | 0.5 | 0.68 | 0.66 | 0.64 | 0.61 | 0.61 | 0.64 | 0.14 |
| SAMPLE4 | 0.7 | 0.89 | 0.88 | 0.86 | 0.83 | 0.85 | 0.86 | 0.16 |
| SAMPLE5 | 1 | 1.22 | 1.2 | 1.2 | 1.17 | 1.18 | 1.19 | 0.19 |
| SAMPLE6 | 2 | 2.58 | 2.5 | 2.49 | 2.51 | 2.48 | 2.51 | 0.51 |
| SAMPLE7 | 3 | 3.66 | 3.7 | 3.64 | 3.64 | 3.64 | 3.66 | 0.66 |

FIG. 10

| SAMPLE No. | ADDED AMOUNT OF LIME (mass%) | MATRIX | SCALE FACTOR 1 | SCALE FACTOR 2 | SCALE FACTOR 3 | SCALE FACTOR 4 | SCALE FACTOR 5 | MEAN VALUE |
|---|---|---|---|---|---|---|---|---|
| SAMPLE8 | 1.0 | 601A-1 | 13 | 12.9 | 12.5 | 12.6 | 12.8 | 12.76 |
| SAMPLE9 | 1.0 | 601A-2 | 12.5 | 12.6 | 12.4 | 13.2 | 12.6 | 12.66 |

FIG. 11A

| SAMPLE No. | ADDED AMOUNT OF LIME (mass%) | MATRIX | Quantitative Value1 (mass%) | Quantitative Value2 (mass%) | Quantitative Value3 (mass%) | Quantitative Value4 (mass%) | Quantitative Value5 (mass%) | MEAN VALUE (mass%) | \|MEAN VALUE − ADDED AMOUNT\| (mass%) |
|---|---|---|---|---|---|---|---|---|---|
| SAMPLE8 | 1.0 | 601A-1 | 1.05 | 1.04 | 1.01 | 1.02 | 1.03 | 1.03 | 0.03 |
| SAMPLE9 | 1.0 | 601A-2 | 1.01 | 1.02 | 1.00 | 1.06 | 1.02 | 1.02 | 0.02 |

FIG. 11B

| SAMPLE No. | ADDED AMOUNT OF LIME (mass%) | MATRIX | INTEGRATED INTENSITY1 (counts) | INTEGRATED INTENSITY2 (counts) | INTEGRATED INTENSITY3 (counts) | INTEGRATED INTENSITY4 (counts) | INTEGRATED INTENSITY5 (counts) | MEAN VALUE (counts) |
|---|---|---|---|---|---|---|---|---|
| SAMPLE8 | 1.0 | 601A-1 | 448.67 | 453.65 | 451.96 | 449.31 | 438.18 | 448.354 |
| SAMPLE9 | 1.0 | 601A-2 | 434.52 | 449.52 | 455.19 | 421.14 | 435.43 | 439.16 |

FIG. 12A

| SAMPLE No. | ADDED AMOUNT OF LIME (mass%) | MATRIX | Quantitative Value1 (mass%) | Quantitative Value2 (mass%) | Quantitative Value3 (mass%) | Quantitative Value4 (mass%) | Quantitative Value5 (mass%) | MEAN VALUE (mass%) | \|MEAN VALUE − ADDED AMOUNT\| (mass%) |
|---|---|---|---|---|---|---|---|---|---|
| SAMPLE8 | 1.0 | 601A-1 | 1.16 | 1.18 | 1.17 | 1.16 | 1.13 | 1.16 | 0.16 |
| SAMPLE9 | 1.0 | 601A-2 | 1.11 | 1.16 | 1.18 | 1.07 | 1.12 | 1.13 | 0.13 |

FIG. 12B

| MEASUREMENT METHOD | Quantitative Value1 (mass%) | Quantitative Value2 (mass%) | Quantitative Value3 (mass%) | Quantitative Value4 (mass%) | Quantitative Value5 (mass%) | MEAN VALUE (mass%) | $\sigma$ | $3\sigma$ | RSD (%) |
|---|---|---|---|---|---|---|---|---|---|
| PARTIAL ACCUMULATION MEASUREMENT | 1.00 | 1.00 | 1.01 | 0.97 | 0.96 | 0.99 | 0.02 | 0.06 | 2.12 |
| NORMAL MEASUREMENT | 1.05 | 1.05 | 0.98 | 0.98 | 0.99 | 1.01 | 0.03 | 0.10 | 3.39 |

FIG. 13

QUANTITATIVE ANALYSIS APPARATUS, METHOD AND PROGRAM AND MANUFACTURING CONTROL SYSTEM

CROSS-REFERENCE TO RELATED APPLICATIONS

This application claims priority to JP Patent Application No. 2021-094383 filed on Jun. 4, 2021, the entire contents of which are hereby incorporated by reference.

RELATED ART

Field of the Invention

The present invention relates to quantitative analysis of a sample by a calibration curve using X-ray diffraction.

Description of the Related Art

Conventionally, quantitative analysis of components of powder products has been carried out for controlling a manufacturing process. For example, in the cement manufacturing process, free lime (f.CaO), which is unreacted Calcium Oxide remaining after calcination of clinker, is managed. As a control value, a quantitative value measured by a titration method is used. The titration method has been adopted as a standard test method, such as ASTM C114-18 of ASTM International and JCASI-01; 1997 "Method for Determining Free Calcium Oxide" of Japan Cement Association. The main minerals and free lime contained in clinker would change to calcium hydroxide by a reaction with moisture in the air over time.

Test methods for determining the content of free lime include the ethylene glycol method (Method A) and the glycerin-alcohol method (Method B) in JCASI-01; 1997 and the ethyl acetoacetate-isobutyl alcohol method (method A) and the alcohol glycerin method (method B) in ASTM C114-18. In these methods, calcium hydroxide is also eluted in addition to free lime in the elution process of free calcium oxide. Therefore, if the quantitation operation is not performed quickly, an error occurs in the quantitative value of the free lime. In addition, when the end point of titration is visually judged, an error is likely to occur by a measurer, and it is difficult to reproduce the result. Therefore, it is troublesome to leave records with keeping a certain quality of the measurement operation.

Unlike such a quantitative analysis method, a quantitative analysis method of a powder sample using X-ray diffraction intensity is also known. For example, the calibration curve method is a method of performing quantitative analysis by using a correlation between the content of crystal phase and the X-ray diffraction intensity. Generally, since the quantitation is performed using the integrated intensity of the largest peak of the test component, which does not overlap with peaks of the coexisting other components, the error factors are few and the accuracy is high. However, when the peak of the test component overlaps with the peaks of coexisting other components, it is difficult to accurately separate the peak of the test component and calculate the integrated intensity. Therefore, it is difficult to apply the method to a sample in which the diffraction peaks of crystal phases complicatedly overlap with each other.

The peak position of belite ($C_2S$) as a matrix component of clinker overlaps with the peak position of the strongest ray of free lime in clinker. Therefore, in order to accurately quantify the free lime using the X-ray diffraction method, it is essential to accurately separate the peak of the free lime from the peak based on belite.

There is also a quantitative analysis method by fitting the calculated theoretical diffraction intensity profile to the measured intensity profile. In that case, the weight ratio of the plurality of crystal phases is calculated using a parameter for calculating the theoretical diffraction intensity of the optimized individual crystal phase. For example, the quantitation calculated using material parameters related to the chemical composition of the identified crystalline phase (see Patent Document 2) and Rietveld quantitation calculated using crystal structural parameters are known. A WPPF (Whole Powder Pattern Fitting) method is used for the profile fitting. In the whole powder pattern fitting, the theoretical diffraction profile and parameter for each crystal phase assumed from the whole diffraction pattern can be acquired.

However, these methods require information on the exact chemical composition and crystal structure of the components that are to be given the quantitative value in the calculation. Then, the quantitative value is calculated so that the total of the set components is 100% Therefore, in the case for a sample including an unidentified substance, since the quantitative value cannot be calculated considering these components, an error in the quantitative value of the unidentified component occurs.

PATENT DOCUMENTS

Patent Document 1: JP-A-2009-168584
Patent Document 2: JP-A1-2019-031019 (Republished Document of WO2019/031019A)

In the conventional quantitative analysis method using the X-ray diffraction intensity, it is not possible to calculate the quantitative value in consideration of the overlap of peaks and the quantitative ratio of unidentified substances which be an error factor in the analysis.

In addition, in a manufacturing process such as that performed in a cement manufacturing plant, the evaluation of multiple samples is required, and the measurement and analysis of a sample are required to be performed as simply and quickly as possible.

SUMMARY OF THE INVENTION

It is an object of the present invention to provide a quantitative analysis apparatus, a method, a program, and a manufacturing control system which can be easy to apply to the control of a manufacturing process and can acquire a precision and accurate quantitative value.

(1) To achieve the above object, the quantitative analysis apparatus of the present invention, comprises a WPPF section for determining parameters of theoretical diffraction intensity by performing whole powder pattern fitting with respect to an X-ray diffraction profile to be analyzed, a scale factor acquiring section for acquiring a scale factor of a test component among the determined parameters, a calibration curve storing section for storing a calibration curve indicating a correlation between scale factors of the test component acquired with respect to a standard sample and content ratios of the test component in the standard sample, and a conversion section for converting the scale factor of the test component acquired with respect to an objective sample into the content ratio of the test component in the objective sample using the stored calibration curve.

(2) Further, in the quantitative analysis apparatus of the present invention, a composite profile acquired by partially accumulating an X-ray diffraction profile of an angle range additionally measured with an X-ray diffraction profile of a whole angle range to be measured is used as the X-ray diffraction profile of the objective sample to be analyzed.

(3) Further, the quantitative analysis apparatus of the present invention further comprises a specification receiving section for receiving specification of conditions, wherein the calibration curve storing section stores a plurality of calibration curves corresponding to conditions, and the conversion section converts the scale factor of the test component acquired with respect to the objective sample into the content ratio of the test component in the objective sample using the calibration curve that conforms to the specified conditions among the stored calibration curves.

(4) Further, in the quantitative analysis apparatus of the present invention, the condition is a type of the objective sample.

(5) The quantitative analysis apparatus of the present invention further comprises a standard sample information storing section for storing measurement conditions to acquire the X-ray diffraction profile to be analyzed in measurement of the standard sample, transmitting the measurement conditions of the standard sample when acquiring the X-ray diffraction profile to be analyzed used for preparing the calibration curve that conforms to the condition from the standard sample information storing section to a control apparatus, and causing the control apparatus to perform measurement control of the objective sample in accordance with the transmitted measurement condition.

(6) Further, in the quantitative analysis apparatus of the present invention, the converted content ratio of the test component is a content ratio of a quality indicator component of a product which is an extraction source of the objective sample.

(7) Further, in the quantitative analysis apparatus of the present invention, the content ratio of the test component in the standard sample has been acquired by a titration method.

(8) Further, in the quantitative analysis apparatus of the present invention, the scale factor acquiring section normalizes the scale factor of the test component acquired with respect to the standard sample with the integrated intensity of the maximum peak in the X-ray diffraction profile to be analyzed.

(9) Further, the manufacturing control system of the present invention comprises the quantitative analysis apparatus according to any one of (1) to (8) and a control apparatus for controlling manufacturing conditions of a product from which the objective sample is extracted.

(10) Further, the method of the present invention, comprises following steps of: determining parameters of theoretical diffraction intensity by performing whole powder pattern fitting with respect to an X-ray diffraction profile to be analyzed; acquiring a scale factor of a test component among the determined parameters; storing a calibration curve indicating a correlation between scale factors of the test component acquired with respect to a standard sample and content ratios of the test component in the standard sample; and converting the scale factor of the test component acquired with respect to the objective sample into the content ratio of the test component in the objective sample using the stored calibration curve.

(11) Further, the program of the present invention, causes a computer to execute following processes of; determining parameters of theoretical diffraction intensity by performing whole powder pattern fitting with respect to an X-ray diffraction profile to be analyzed; acquiring a scale factor of a test component among the determined parameters; storing a calibration curve indicating a correlation between scale factors of the test component acquired with respect to a standard sample and content ratios of the test component in the standard sample; and converting the scale factor of the test component acquired with respect to the objective sample into the content ratio of the test component in the objective sample using the stored calibration curve.

BRIEF DESCRIPTION OF THE DRAWINGS

FIGS. 8A to 8C are tables and graphs showing the scale factors, the calibration curve, and the quantitative values after conversion in the practical examples, respectively.

FIGS. 9A to 9C are tables and graphs showing the integrated intensities (counts) acquired by the calibration curve method, the calibration curve, and the quantitative values after the conversion, respectively.

FIG. 10 is a table showing the quantitative values by the Rietveld method.

FIGS. 11A and 11B are tables showing the scale factors in the practical examples and the quantitative values after the conversion using the calibration curve when the matrices different from that of the calibration curve are used, respectively.

FIGS. 12A and 12B are tables showing the integrated intensities (counts) and the quantitative values after the conversion using the calibration curve when the matrices different from that of the calibration curve are used, respectively.

FIG. 13 is a table showing the quantitative values in the practical examples when the partial accumulation measurement and normal measurement (single measurement) are used.

DETAILED DESCRIPTION OF THE INVENTION

Figure 1:
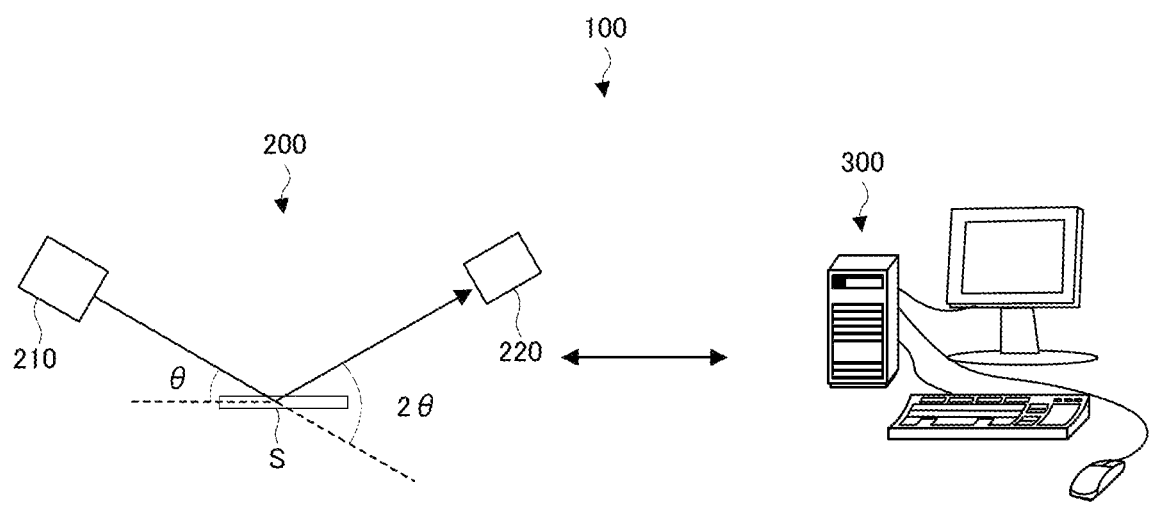
FIG. 1 is a schematic diagram showing the quantitative analysis system of the present invention.

Next, embodiments of the present invention are described with reference to the drawings. To facilitate understanding of the description, the same reference numerals are assigned to the same components in the respective drawings, and duplicate descriptions are omitted.

[Principle]

When the sample is a mixture of a plurality of crystal phases, the powder diffraction pattern of the sample is a powder diffraction pattern in which the powder diffraction patterns of the plurality of crystal phases included in the sample are added together based on the contents. The WPPF method is an analytical method in which a diffraction pattern calculated from profile parameters, lattice parameters, orientation parameters, etc. are fitted to a powder diffraction pattern of a sample by a nonlinear least squares method.

Since fitting is performed to the whole powder diffraction pattern rather than the individual peak profile, the overlap can be separated even if the diffraction peak of the test component overlaps with the diffraction peaks of other coexisting components.

In the present invention, the scale factor of crystal phase of the test component is acquired by the whole powder pattern fitting, and is applied to the calibration curve. By using the calibration curve, it is possible to quantify the test component by converting the scale factor of the test component contained in the objective sample into the content ratio.

When the powder diffraction pattern y(2θ) of the sample can be regarded as superposition of the background intensity $y(2\theta)_{back}$ and the powder diffraction pattern $y(2\theta)_k$ of each of the K crystalline phases, the powder diffraction pattern y(2θ) of the sample is expressed by the following equation (1). The equation (1) is used to calculate the theoretical diffraction intensity in the whole powder pattern fitting.

$$y(2\theta) = y(2\theta)_{back} + \Sigma_{k=1}^{K} y(2\theta)_k \quad (1)$$

As the fitting function $y(2\theta)_k$ of the kth crystallographic phase described in the equation (1), a function of Equation (2) or Equation (3) is preferably used. An appropriate fitting function is set for each of the other crystal phases coexisting with the crystal phase of the test component.

$$y(2\theta)_k = \Sigma_j Sc_k I'_{jk} P(2\theta)_{jk} \quad (2)$$

$$y(2\theta)_k = Sc_k y(2\theta)'_k \quad (3)$$

Here, $Sc_k$ is a scale factor in both the expressions. $P(2\theta)_{jk}$ is a normalized profile function representing the profile shape in the jth peak of the kth crystallographic phase. $I_{jk}$ is defined in $I_{jk} = Sc_k \times I'_{jk}$. The set of integrated intensities $\{I'_{jk}\}$ may be a set of integrated intensities separately measured (or calculated) for a single phase sample of the k th crystal phase, or may be a function of crystal structural parameter.

The $y(2\theta)_k$ may be a profile intensity separately measured (or calculated) for a single phase sample of the k th crystal phase, or may be calculated extemporaneously at the time of fitting based on crystal structural parameters.

An analysis method in which crystal-structure parameters are included in parameters for calculating a theoretical diffraction pattern is specifically referred to as the Rietveld method. Generally, in the Rietveld method, the integrated intensity ratio of each peak is determined by the crystal structure parameters.

When the observed pattern is decomposed into individual Bragg reflection components, the intensity of the whole pattern can be changed instead of the integrated intensity by multiplying the integrated intensity of each component by the scale factor. Further, if the set of integrated intensity parameters are refined to be specified in advance for individual single component samples, it is possible to perform the fitting by fixing the integrated intensity parameters at their value, and refining the scale factors instead.

The scale factor increases or decreases in proportion to the integrated intensity of each crystalline phase, because it is a parameter for matching the relative calculated intensity to the absolute observed intensity. The scale factor is also proportional to the weight of the component corresponding thereto. Since the scale factor optimized by the WPPF method can be regarded as the integrated intensity after the peaks are separated, the integrated intensity used in the calibration curve method can be replaced by the scale factor.

In the quantitative analysis of the test component, a calibration curve is prepared and used from the relationship between the scale factor of the test component and the content ratio of the test component with respect to the standard sample. For the content ratio of the test component of the standard sample, it is preferable to use a weight fraction (wt %) calculated from the weighed value of the mixed test component. By preparing a calibration curve with one of the two axes as a scale factor and the other as a weighed value, a quantitative value is acquired as an absolute value. Further, not limited to the weighed value, the content ratio of the test component of the standard sample acquired by an analysis method capable of quantifying the content of the test component may be used. When the scale factor is converted with the content ratio, it is affected by the accuracy of the analytical method for quantifying the content, but the accuracy of the calibration curve is improved by continuously accumulating data, and it can be used as a control value.

Using the calibration curve, the scale factor of the test component of the objective sample is converted into the content ratio of the test component. In this case, if the quantitative value of the test component in the objective sample is within the range specified by the calibration curve, the test component can be quantified under recognition of the influence of an unidentified substance as an error factor by a quantification method in which the weight ratio is calculated using a parameter for calculating the theoretical diffraction intensity. As a result, the quantitative values can be acquired with high accuracy and precision.

In manufacturing process of a product for which evaluation of multiple samples is required, as simple and rapid measurement as possible is required. In order to acquire an accurate quantitative value, it is necessary to mix an intensity standard substance with an objective sample and perform correction with the peak intensities of an internal standard sample in order to calibrate the X-ray intensity. However, the mixing operation of such a standard sample is laborious and time consuming. Therefore, when preparing a calibration curve, it is preferable to use relative scale factors normalized by the intensity of the largest peak with respect to the test components. It is possible to evaluate in a short time because the mixing of the standard substance is not necessary at the time of quantitation of the test component, and the burden on the worker is reduced.

In addition, in order to acquire an accurate quantitative value, it is necessary to make the measurement conditions and the analysis conditions of the objective sample equal to those of the external standard sample. For example, it is preferable to store the optimum conditions used for measurement and analysis of the standard sample as a template so as to be available. When the calibration curve to be applied to the quantitation of the objective sample is determined, the measurement conditions and the analysis conditions of the objective sample can be determined automatically. Thus, it is not necessary for the operator to set the parameters of the measurement and analysis conditions, and the application to the control of the manufacturing process is facilitated.

Hereinafter, the specific embodiments for realizing the present invention are described.

First Embodiment (Quantitative Analysis System)

A quantitative analysis system 100 measures an X-ray diffraction profile and quantitatively analyzes a content ratio of a test component contained in a sample. FIG. 1 is a schematic diagram showing the quantitative analysis system 100. The quantitative analysis system 100 comprises an X-ray diffractometer 200 and a processing apparatus 300. The X-ray diffraction apparatus 200 and the processing apparatus 300 are connected by a communication cable, a network, or the like, and can transmit and receive data.

(X-Ray Diffraction Apparatus)

X-ray diffraction apparatus 200 comprises an X-ray irradiation section 210 and the detector 220. The X-ray irradiation section 210 irradiates X-rays toward the held polycrystal sample S, the detector 220 detects the X-ray diffracted beam diffracted by the sample S. The X-ray irradiation section 210 and the detector 220 can perform scan measurement at different diffraction angles. The X-ray diffraction profile detected by the detector 220 is transmitted to the processing apparatus 300 (as a quantitative analysis apparatus and a control apparatus).

(Processing Apparatus)

Figure 2:
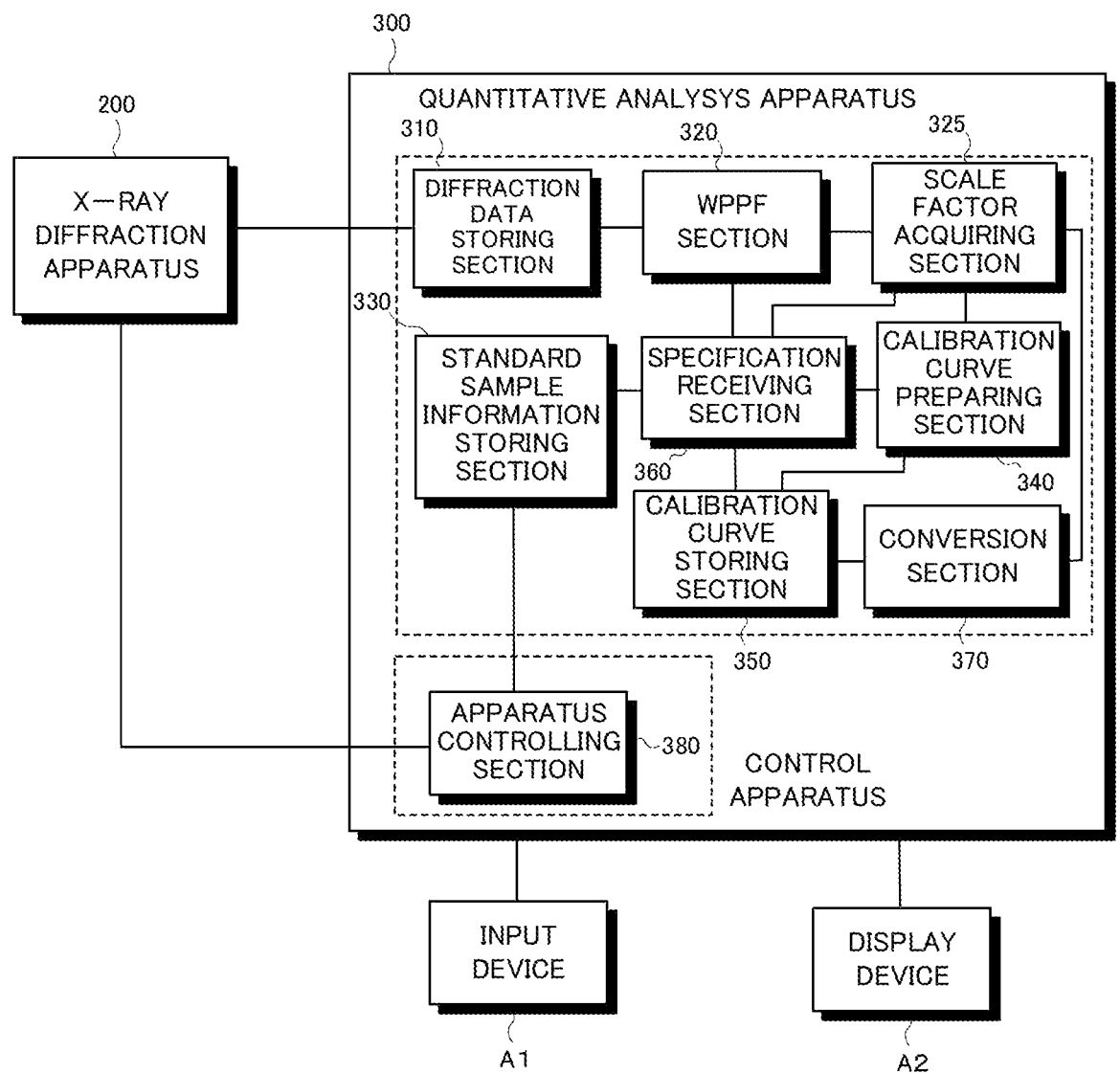
FIG. 2 is a block diagram showing the processing apparatus of the present invention.

FIG. 2 is a block diagram showing the processing apparatus 300. The processing apparatus 300 includes a computer formed by connecting a CPU (Central Processing Unit), a ROM (Read Only Memory), a RAM (Random Access Memory), and a memory to a bus, may be a PC, for example, and may be a server placed on a cloud. The processing apparatus 300 receives the data of the X-ray diffraction profile from the X-ray diffraction apparatus 200. The processing apparatus 300 is connected to the input device A1 and the display device A2, and can input and output to and from a user. The input device A1 is an input device such as a keyboard or a pointing device, and the display device A2 is an output device such as a display. Each function is realized by executing a program. In the example shown in FIG. 2, the processing apparatus 300 functions independently as the quantitative analysis apparatus and the control apparatus, but each may be a separate processing apparatus. In any case, the apparatuses and devices are connected to each other so that information can be transmitted and received.

The processing apparatus 300 comprises a diffraction data storing section 310, a WPPF section 320, a scale factor acquiring section 325, a standard sample information storing section 330, a calibration curve generating section 340, a calibration curve storing section 350, a specification receiving section 360, a conversion section 370, and a apparatus controlling section 380. The diffraction data storing section 310, WPPF section 320, the scale factor acquiring section 325, the standard sample information storing section 330, the calibration curve generating section 340, the calibration curve storing section 350, the specification receiving section 360, and the conversion section 370 constitute the quantitation analysis apparatus, and the apparatus controlling section 380 constitutes the control apparatus.

The diffraction data storing section 310 stores the data of the X-ray diffraction profile received from the X-ray diffraction apparatus 200 in association with each of the samples. The X-ray diffraction profile is appropriately read out and used for fitting or the like.

The WPPF section 320 performs profile fitting of the assumed fitting function for the X-ray diffraction profile of the measured sample, and optimizes the parameters for calculating the theoretical diffraction intensity of each crystalline phase. The conditions of the fitting can also be preset so that only the scale factor is refined.

The scale factor acquiring section 325 acquires the scale factor of the test component from among the parameters optimized by the WPPF section 320. The acquired scale factors are determined to be those of the standard sample or the objective sample, and are sent to the calibration curve generating section 340 or the conversion section 370. Details of the calculation of the fitting and the scale factors are described later.

The standard sample information storing section 330 stores the content ratios of the test component of the standard sample in association with types of the standard sample. The content ratios of the test components of the standard sample are input by the user to be stored. The content ratios of the test components of the standard sample are appropriately read out when the calibration curve is prepared. In addition, the conditions under which the standard sample has been measured in order to prepare the calibration curve and the analysis conditions used for WPPF are stored together. In the analysis of the objective sample, when the calibration curves to be applied are determined, they are appropriately read out and used for each process.

The calibration curve generating section 340 prepares a calibration curve by linear approximation such as the least squares method based on the content ratios of the test components of a plurality of standard samples having different content ratios and the plots of scale factors optimized by WPPF method from the X-ray diffraction profiles for the standard samples. The calibration curves can also be prepared for a plurality of standard samples of different types according to the conditions.

The calibration curve storing section 350 stores data of the prepared calibration curve. The calibration curve is specified by data such as coefficients representing a linear function or another function. The calibration curve storing section 350 can also store data of a plurality of calibration curves according to conditions.

The specification receiving section 360 accepts specification of a condition. The conditions are specified according to the input by the user or the selection determination by the AI. For example, a user interface (UI) screen is displayed on the display of the display device A2 for allowing the user to input the specification of the condition, and the user operates the input device to input the information for the item requested to be input on the screen. Thus, even when the quantitation of the test components is assumed in advance under a plurality of conditions, an appropriate calibration curve prepared in accordance with the specified conditions is selected, and high accurate quantitation becomes possible.

The condition is preferably a type of the objective sample. Types of products are often determined by correlating differences in types and weight ratios of the components that constitute the product, and differences in the physical properties such as crystallinity and particle size of the specific components. The type of the objective sample depends on the type of product. When the diffraction pattern of the objective sample is similar to that of the standard sample, a calibration curve prepared using the standard sample can be applied. Therefore, it is preferable that the type of the objective sample and the applicable type of the standard sample or the applicable calibration curve are stored in association with each other in advance. In addition, when a plurality of the test components is contained in the objective sample, it is preferable to set the type of the test component so as to be selectable.

The conversion section 370 converts the scale factor of the test component of the objective sample into the content ratio of the test component using the stored calibration curve. The conversion section 370 can also use data of a calibration curve that conforms to a specified condition among stored calibration curves.

It is preferable that the converted content ratio of the test component is a content ratio of the quality indicator component of the product which is an extraction source of the objective sample. The component whose trend is known in advance as to how the quality of the product changes depending on the content ratio are prepared to be used as a quality indicator component, so that the component can be quantified as the test component. The quantitative value can be converted in accordance with the method of specifying the content of the test component managed by the user, or the information of the quantitative value can be sent to the control apparatus for controlling the manufacturing condition. For example, free lime is referred as a quality indicator component after calcination of clinker.

The apparatus controlling section 380 performs measurement with the X-ray diffraction apparatus according to the measurement condition, and acquires the X-ray diffraction profile. For example, the measurement condition of the standard sample at the time of acquiring the X-ray diffraction profile to be analyzed used for preparing the calibration curve that conforms to the condition are read out from the standard sample information storing section 330, and the measurement of the objective sample is performed in accordance with the read measurement condition.

(Method of Preparing a Calibration Curve)

Figure 3:
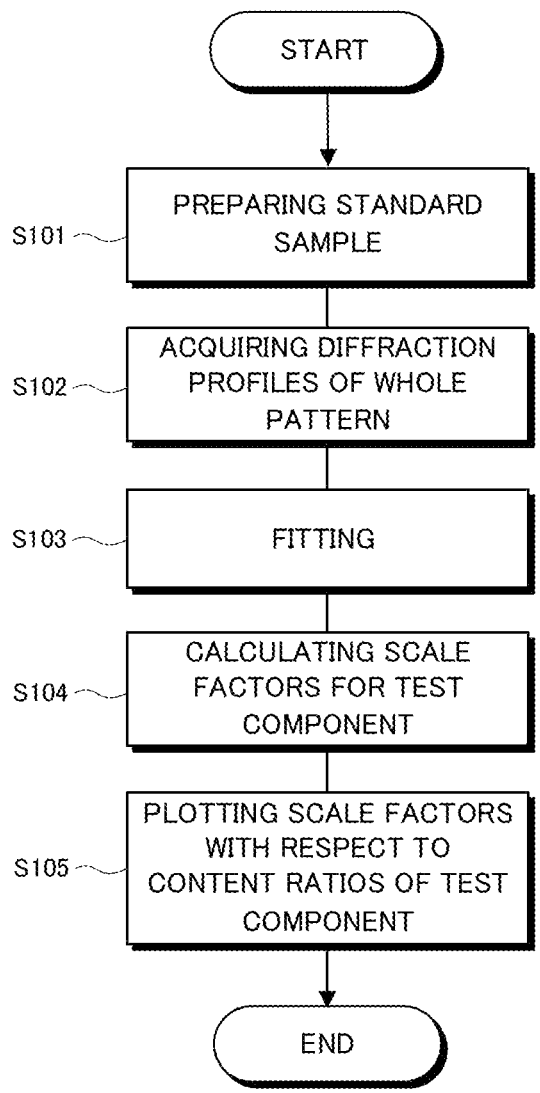
FIG. 3 is a flowchart showing the preparation method of the calibration curve.

Next, a method of preparing a calibration curve using the quantitative analysis system 100 configured as described above and a method of quantitative analysis are described. FIG. 3 is a flowchart showing the preparation method of the calibration curve. First, a plurality of standard samples having different content ratios of the test component are prepared (step S101). For example, lime as a test component is added to a matrix such as cement for research of the Cement Association. In this case, standard samples with different content ratios of the test component are prepared according to the required data point so that 5 to 9 data points are acquired in the range specified by the calibration curve. For example, standard samples having lime content ratios of 0.1%, 0.3%, 0.5%, 0.7%, 1.0%, 2.0%, and 3.0% are prepared. As described above, if the range specified by a calibration curve is several wt % or less, a calibration curve with high linearity can be acquired.

Then, the sample is measured by the X-ray diffraction apparatus 200 to acquire a diffraction profile of the whole pattern (e.g., 2θ=10 to 65°) (step S102). After all the diffraction profiles of the prepared standard samples are acquired, the scale factors of the test component are calculated by the WPPF analysis.

It is preferable that the optimum condition used for measurement and analysis of the standard samples be stored as a template. The measurement template includes information such as a measurement range, a step, and a scan speed. In addition, when a specific peak of the test component is partially accumulated, it is preferable that the integration range, the number of times of integration, and the like be recognized. The partial accumulation measurement is described later.

In the preparation of analysis templates, the crystal phases constituting the standard sample are identified and the initial values and analysis procedures of the respective analysis parameters in WPPF analysis are set for the respective identified crystal phases. In the identification of crystalline phases, at least, four major components (alite, belite, aluminate, and ferrite) and lime are identified in the case of clinker. In the case, as databases used for the identification, ICDD, ICSD, COD, cement databases prepared by device manufacturers, and the like are referred.

When the pattern of the added test component differs from the theoretical diffraction profile calculated from the information in the database, the diffraction profile of only the added test component may be acquired and used for the initial value of the analysis parameter. Since the scale factor of the test component varies depending on the content of the test component, it is preferable to set the analysis condition of the sample, whose content ratio of the test sample is located intermediate the range specified by the calibration curve, as a template.

Fitting the theoretical diffraction profile calculated from the initial values of the parameters set in the analysis template to the X-ray diffraction profile acquired by the measurement is performed (step S103) and the scale factor of the test component are refined (step S104). By refining the scale factor of each crystalline phase, the calculation profile of each crystalline phase which matches the X-ray profile acquired by the measurement can be acquired.

The scale factors of the respective crystal phases acquired as a result of the WPPF method can be regarded as the integrated intensity of the respective crystal phases after the peaks are separated. Therefore, for the vertical axis of the calibration curve, the integrated intensity can be replaced with the scale factor.

The refined scale factors are plotted against the corresponding content ratios of the test component of the standard samples, and a calibration curve is prepared by linear approximation (step S105) and stored in the storing section. At this time, it is preferable to prepare a calibration curve for each type of the standard sample and store the calibration curve in correlation with a type of the objective sample or the product. Even when the type of the objective sample is different, if it is confirmed that the analysis can be performed using a calibration curve prepared with the same standard sample, the calibration curve can be used. In addition, when a plurality of test components are contained in the objective sample, it is preferable to prepare a plurality of calibration curves having different types of test components using standard samples in which the types of the test components to be mixed are respectively different with respect to the same matrix component.

(Method of Quantitative Analysis)

Figure 4:
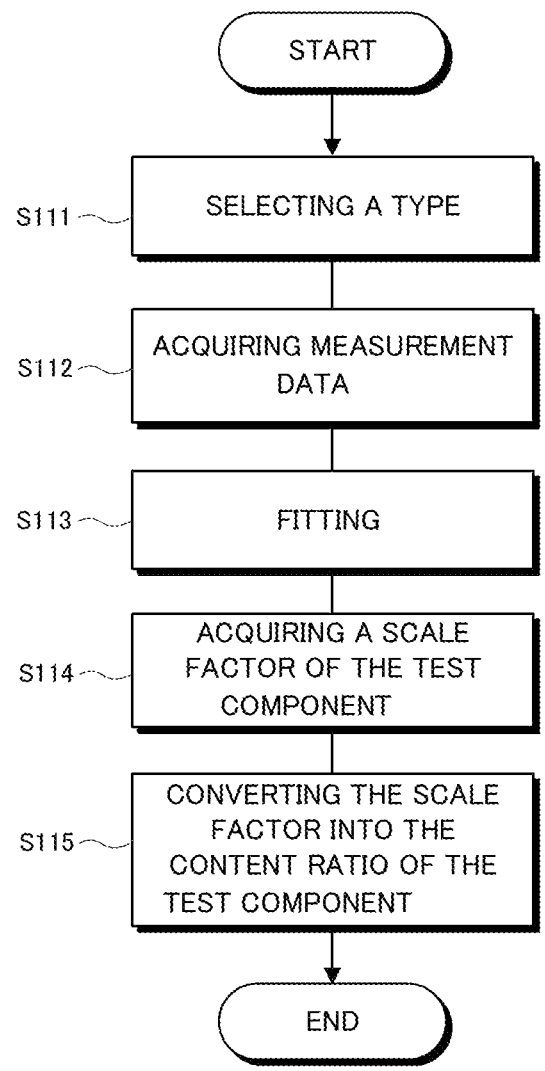
FIG. 4 is a flowchart showing the method of quantitative analysis of the present invention.

FIG. 4 is a flowchart showing the method of quantitative analysis. The method of quantitative analysis is carried out by executing the program. In the processing apparatus 300 in which the software is started, the optimum conditions of measurement and analysis are set for the respective standard samples used for preparing a calibration curve in advance. First, the processing apparatus 300 receives a user's instruction to select a type of a objective sample and to start measurement (step S111). The type of the objective sampled is stored in advance as an input candidate in the standard sample information storing section 330 according to the type of the product, and can be set by the user selecting one of them. In response to this, the template of the measurement condition to be used, the template of the WPPF analysis, and the calibration curve of the test component is set. Then, in order to perform measurement under the same condition as that of the standard sample measured to prepare the calibration curve used for analysis, information of the template of the measurement condition is transferred to the apparatus controlling section, and measurement of the objective sample is started.

Next, the measurement data of the objective sample is acquired (step S112). With respect to the acquired measured data, the calculation profile is calculated using the preset templates, and the profile is fitted to the X-ray diffraction profile with the WPPF method (step S113). This analysis is performed automatically at the same time as the measurement data acquisition. The scale factor of the test component optimized by the profile fitting is acquired (step S114). The acquired scale factor is automatically acquired by determining the same crystal phase as the test component based on the information of the test component of the applied calibration curve. Alternatively, it may be acquired based on the information of the test component specified by the user.

Then, the scale factor is converted into the content ratio of the test component by using the calibration curve set on starting the measurement (step S115). In the calibration curve, since the content ratio calculated from the weighed value of the test component is used, the quantitative value is converted as the absolute value of the test component. Therefore, even in the presence of unidentified substances, performing fitting to use the refined scale factor enables accurate quantification. Since the calibration curve can be used for other objective samples as long as the type of the objective sample is the same, reproducible, accurate and precision quantitative values can be acquired. It is preferable that the quantitative analysis of the test component is performed automatically.

Second Embodiment (Partial Accumulation Measurement)

Figure 5A:
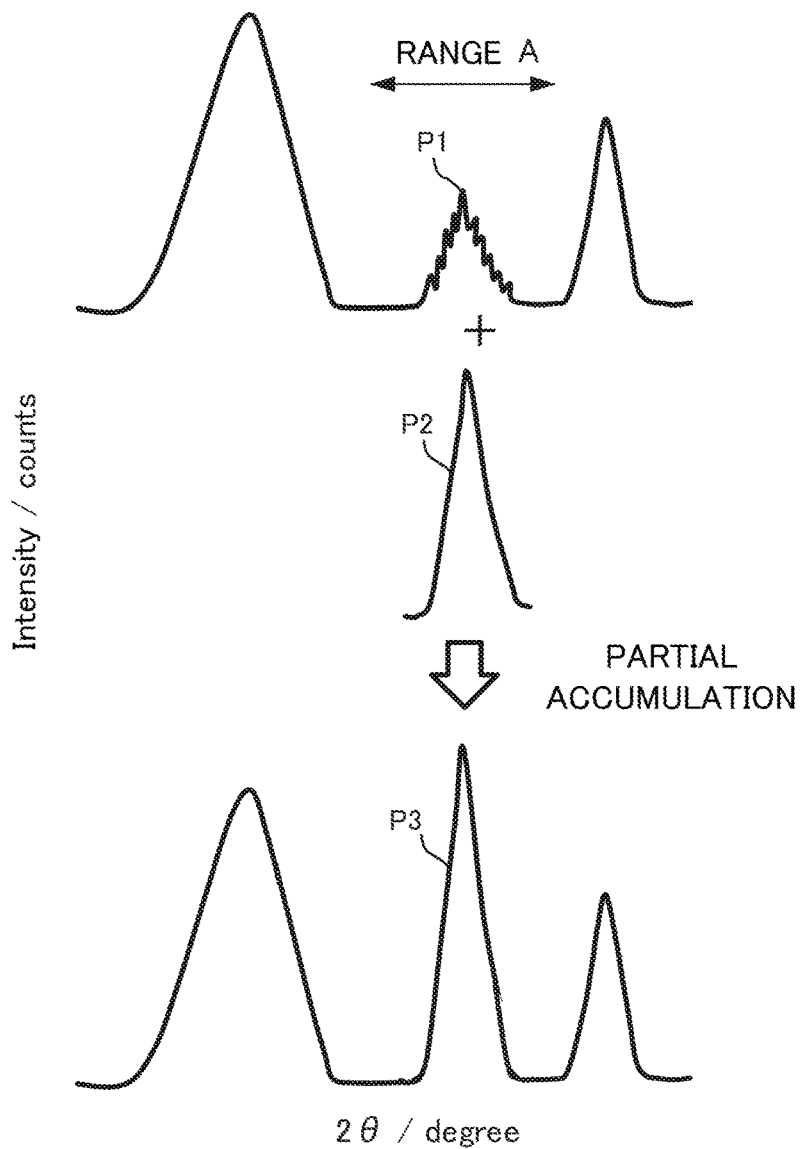
FIGS. 5A and 5B are schematic diagrams showing the methods of integration and normalization of results in the partial accumulation measurement, respectively.
Figure 5B:
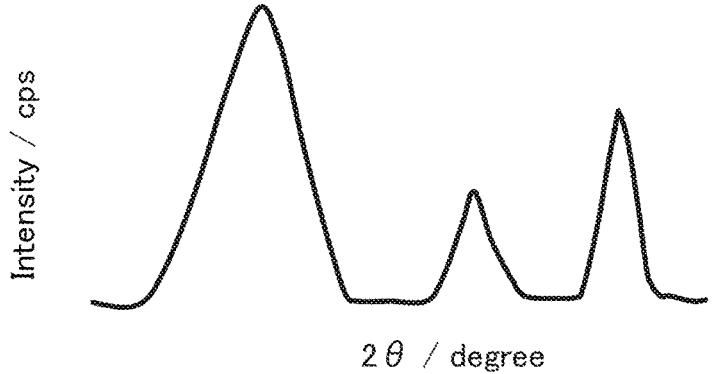

In the above embodiment, the whole range of measurement is subjected to X-ray diffraction measurement by a single scan, it may be performed multiple scans for a range in which the peak of interest is included (partial accumulation measurement). FIGS. 5A and 5B are schematic diagrams showing the methods of integration and normalization of results in the partial accumulation measurement, respectively.

There is a statistical variation in the X-ray counting, and the statistical variation $\sigma$ is $\sigma=\sqrt{I}$, where I is the intensity (counts). When the profile of the crystal phase is acquired by a single scan, the statistical variation differs depending on the intensity of the observed peak. In particular, the small peak has a large statistical variation. Therefore, the ratio $\sigma/I$ of the statistical variation to the intensity can be suppressed by repeating partial scanning for peaks having a low intensity that can be acquired by a single scan to acquire high intensity data. In the partial accumulation measurement, only the peak based on the test component (range A) are separately measured after the whole pattern is measured, and the detected X-ray intensities are integrated to increase intensities. As a result, it is possible to efficiently improve the analysis precision of the test component. In particular, since the statistical variation can be reduced by applying the method to the minute peak, the accuracy of the profile fitting of the minute component is improved.

Specifically, as shown in FIG. 5A, the peak intensity P1 in the measurement of the whole pattern and the peak intensity P2 in the measurement of the range A are synthesized to acquire the peak intensity P3. In the synthesis, it is preferable to add the intensities measured a plurality of times and normalize with the sum of the measurement times. When the display unit of the intensity is converted from counts to cps, a profile in which the integrated portion is smoothly connected to the other as shown in FIG. 5B is acquired.

In the case, at least 2 peaks for performing the second partial measurement are required, and it is preferable that they are the strongest peak and the second peak. However, when there is overlap of peaks, it is preferable to use a peak without overlap.

In this way, as the X-ray diffraction profile of the objective sample to be analyzed, a composite profile acquired by partially accumulating the X-ray diffraction profile of the angle range additionally measured with respect to the X-ray diffraction profile of the whole angle range to be measured is used.

Third Embodiment (Application)

(Application to Cement Manufacturing Process)

The quantitative analysis system 100 configured as described above can be applied to, for example, a cement manufacturing plant. Cement is produced by mixing clinker with gypsum and additives. Clinker is a sintered lump obtained by calcination a cement raw material (limestone, clay, silicic acid raw material, iron oxide raw material, and the like) in a kiln or the like. As the main minerals of clinker, there are alite, belite, aluminate, and ferrite.

Free lime (f.CaO) is the calcium left in the clinker produced without reacting with silicon dioxide, aluminum oxide, etc. Immediately after calcination process, it occurs in the form of calcium oxide (CaO). Free lime may change to calcium hydroxide ($Ca(OH)_2$) and calcium carbonate ($CaCO_3$) over time, causing deterioration of concrete. Therefore, accurate and precision quantitative analysis is required for free lime. At the cement manufacturing site, it is managed as an index indicating the degree of calcination of the clinker.

Figure 6:
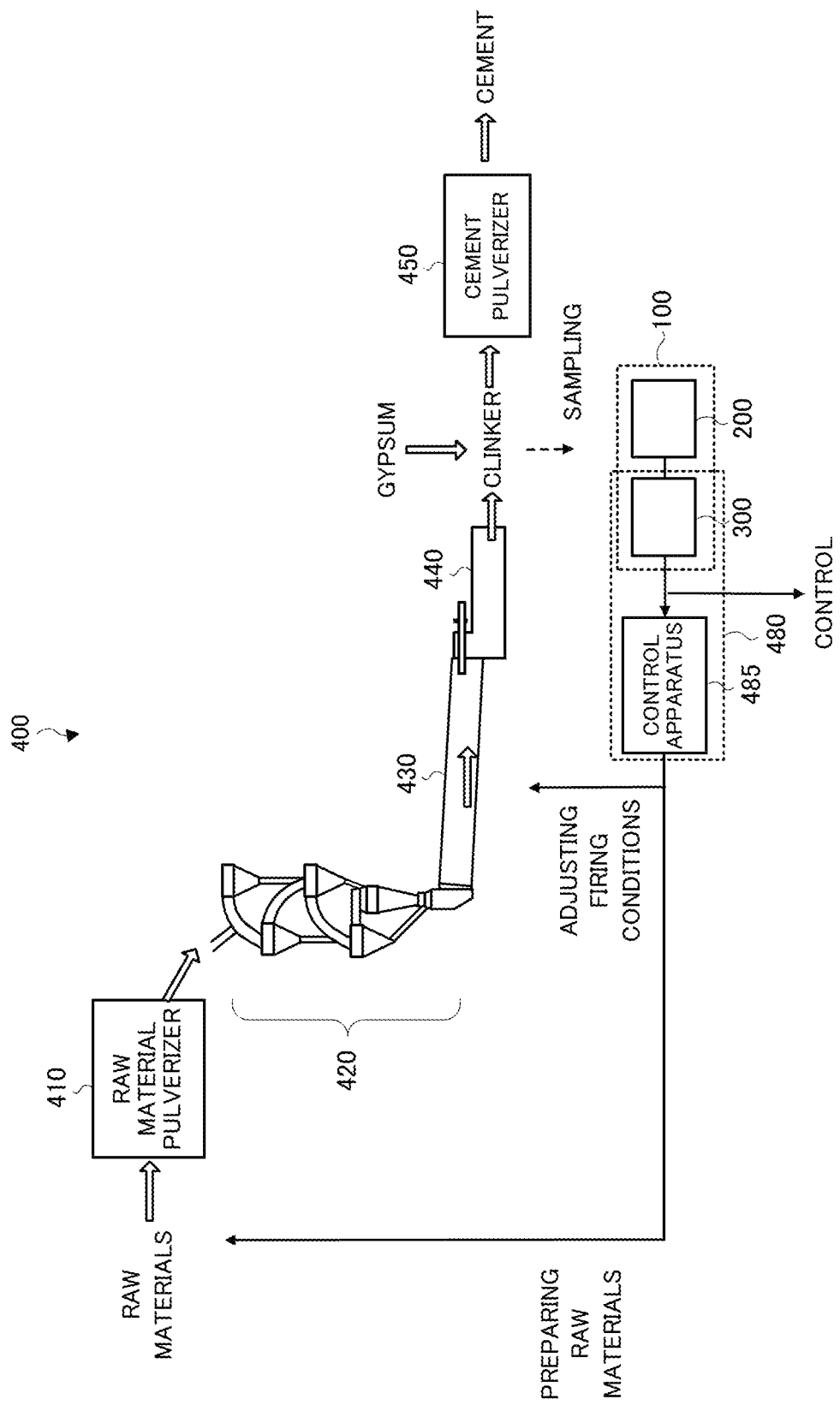
FIG. 6 is a schematic diagram showing the cement manufacturing plant.

FIG. 6 is a schematic diagram showing the cement manufacturing plant 400. The cement manufacturing plant 400 includes a raw material pulverizer 410, a preheater 420, a rotary kiln 430, a cooler 440, a cement pulverizer 450, a quantitative analysis system 100, and a control apparatus 485.

The quantitative analysis system 100 includes a processing apparatus 300, and the processing apparatus 300 and the control apparatus 485 constitute a manufacturing control system 480. The control apparatus 485 controls the manufacturing conditions of the clinker which is an extraction source of the objective sample for analyzing the content ratio of the free lime. Thus, the content ratio of the component quantified with high accuracy is fed back to the manufacturing conditions of the clinker, and the manufacturing conditions can be automatically adjusted to a suitable state. Note that, as a condition for producing a clinker, a blending condition of a cement raw material and a baking condition may be referred.

The operation of the cement manufacturing plant 400 configured as described above is described. First, a raw material pulverizer 410 pulverizes a lumpy cement raw material. Powder cement raw material is continuously supplied to the preheater 420. The preheater 420 is provided in the front stage of the rotary kiln 430, and is composed of a multistage cyclone, and preheats the pulverized cement raw material.

The rotary kiln 430 fires the cement raw material discharged from the preheater 420 at about 1450° C. to generate a clinker. The cooler 440 is a so-called clinker cooler and cools the clinker produced by the rotary kiln 430. In the clinker, a mixed material to which gypsum or the like is added is charged into the cement pulverizer 450, and the cement pulverizer 450 pulverizes the mixed material to discharge the cement.

In such a cement manufacturing process, the cooled clinker is analyzed by the quantitative analysis system 100. The control apparatus 485 adjusts the raw material or the calcination condition in accordance with the acquired content ratio. For example, when an unachieved calcination temperature is estimated as a cause of an increase in free lime, the calcination temperature of the rotary kiln can be increased. In addition, when the content ratio of the specific impurity is high, the mixing ratio of the raw material as the cause of the impurity can be reduced. Incidentally, the content ratio of the free lime acquired by the quantitative analysis system 100 is controlled in accordance with the management law for each factory.

(Application to Titration Method)

At the time of preparing the calibration curve, the content ratio of the free lime acquired by the titration method may be used as those calculated from the weighed value of the standard sample. In other words, the calibration curve is prepared by plotting the acquired scale factor and the quantitative value acquired by the titration method. Thus, the free-lime content ratio can be controlled in the field where the titration method is used as a standard.

For clinker produced in cement manufacturing plant, the determination of free lime by titration method is adopted as a standard test method. After evaluation by a titration method in advance, the sample evaluated by the titration method is measured and analyzed by the X-ray diffraction apparatus 200 and the processing apparatus 300.

At the time of analysis, the processing apparatus 300 receives an instruction to select the type of an objective sample and start measurement. At the time, it is preferable that a method of specifying the content of the test component of the standard sample can be selected. For example, when a titration method is selected for the specified method, an appropriate calibration curve is applied to the analysis among the calibration curves using the content ratio specified by the titration method. Then, the WPPF analysis is performed on the acquired measured data using the templates set in advance, and the scale factors of the test components are calculated. Then, quantitative analysis of the test component is automatically performed using the calibration curve prepared in advance. This analysis is preferably performed automatically at the same time as the measurement data acquisition.

In order to match the states of the samples used for both analysis of the titration method and X-ray diffraction measurement, it is preferable to match the timing of the measurement. In addition, it is preferable to periodically (about one month) perform the titration method the optimization of the calibration curve. In this way, it is possible to manage the correlation with the result evaluated by measurement methods other than X-ray diffraction.

Note that, in the application to the cement manufacturing plant described above, the objective sample is not limited to a clinker, and may be a cement of a product. In addition, the test component to be subjected to quantitative analysis is not limited to free lime, and may be a component which can be used as another control indicator.

It is preferable that the quantitative analysis system 100 is applied to a cement manufacturing plant, but it is also applicable to other fields in which the components of the quality control indicator of the product can be quantified by X-rays. Examples of such fields include manufacturing plants for such as medicine, food, iron, ceramic powder, and catalyst. For example, in the pharmaceutical industry, it is known that the presence of components having different crystal structures (crystalline polymorphs) among pharmaceuticals causes differences in dissolution rate and affects drug efficacy. A calibration curve can be prepared using a crystalline polymorph as a test component, and a quantitative value can be acquired. The acquired quantitative value can be fed back to the manufacturing process as a quality control indicator to change or adjust the crystallization condition.

Example

It has been confirmed that the accuracy and precision of the quantitative value of lime are improved by the present invention by actually mixing the lime of the standard sample into the cement of the standard as a matrix and calculating the content ratio of the lime respectively by the above quantitative analyses (practical examples), the calibration curve method and the WPPF method. SmartLab StudioII (Rigaku, SLSII) was used for the analysis of the practical examples and the WPPF method. Further, the calculation of the integrated intensity in the calibration curve method was used Integrated Intensity Calculation (a software manufactured by Rigaku).

Figure 7A:
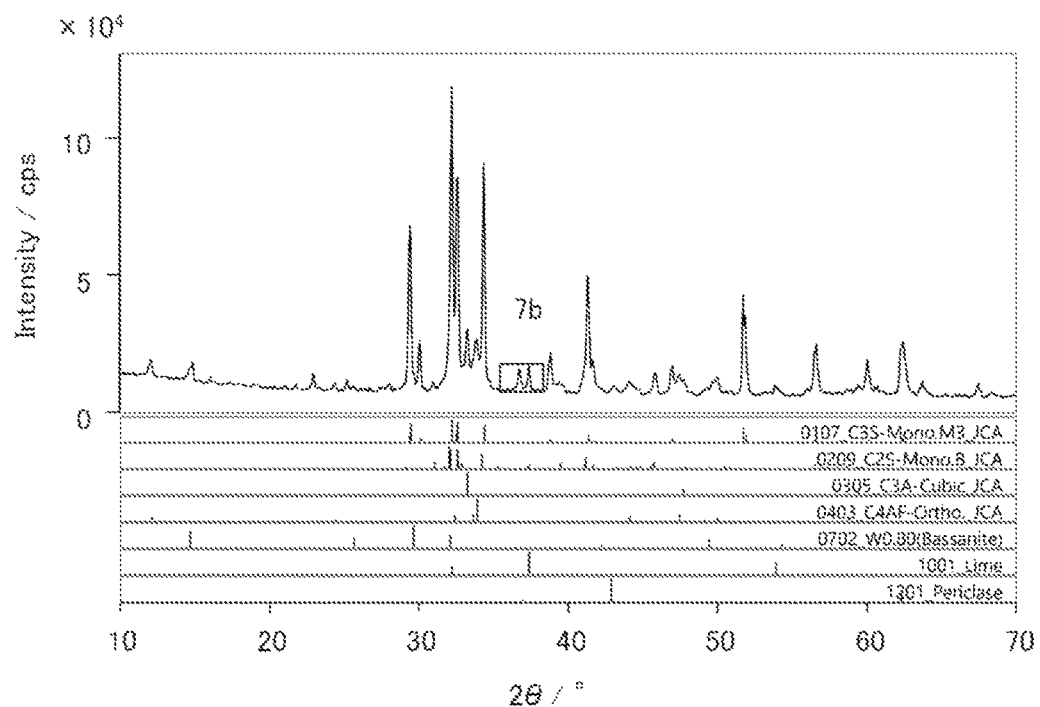
FIGS. 7A and 7B are diagrams showing whole pattern and a part of the X-ray diffraction profile, respectively.
Figure 7B:
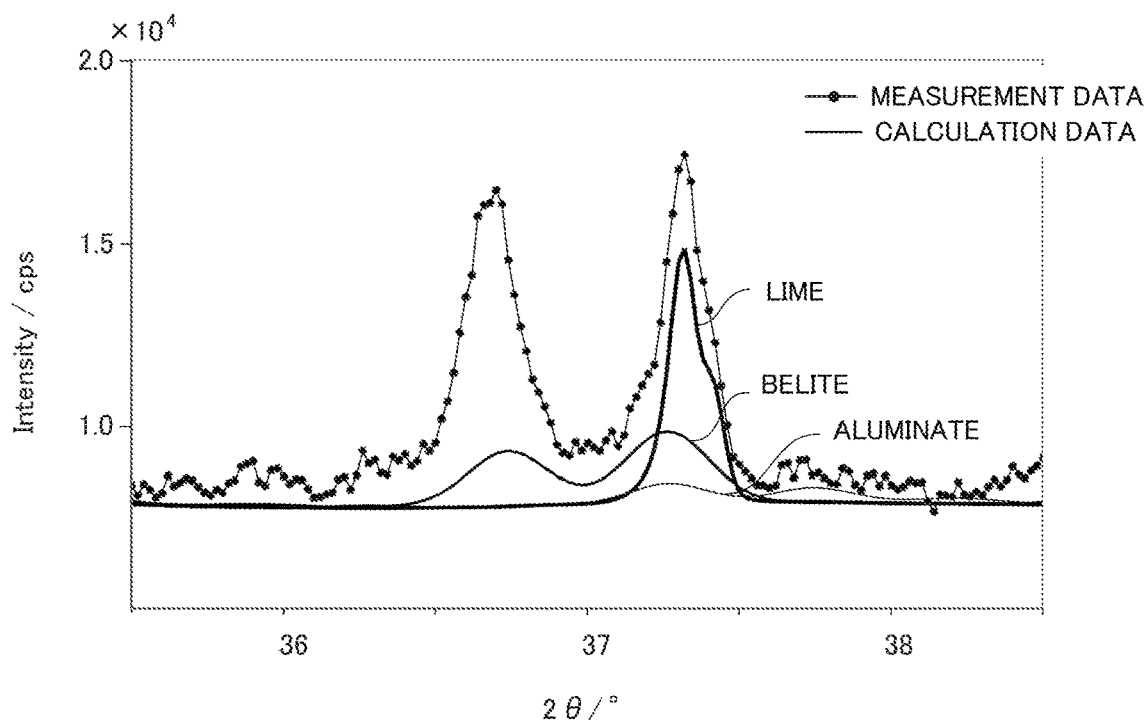

First, a cement for research provided by the Cement Association was used as a matrix, to which lime was mixed to have a predetermined content ratio to prepare samples 1 to 7. Then, X-ray diffraction measurements were performed on the respective samples. The data of sample 5 with a lime content ratio of 1.0 mass % is illustrated. FIG. 7A is a diagram showing whole pattern of the X-ray diffraction profile. FIG. 7B is an enlarged view of the frame 7b in FIG. 7A in order to observe the peaks of the lime. The solid lines in FIG. 7B show the calculation profiles of respective crystalline phases acquired from the X-ray diffraction profile and the WPPF method. As shown in FIG. 7B, the peak of the lime overlaps with the peaks of other components contained in the cement.

Comparison of Practical Examples, Calibration Curve Methods and WPPF Methods Using the Same Matrix First, the quantitative results by the difference of the analytical technique were compared when the identical matrix was used. In the practical example, the scale factor of the lime (repeated measurement result) was calculated by the WPPF method, and the calibration curve was prepared using the mean value of the acquired scale factor. Then, the quantitative analysis was performed by the scale factor calibration curve method, and the quantitative results were acquired according to the added amount. FIGS. 8A to 8C are tables and graphs showing the scale factors, the calibration curve used for the conversion into the content ratio and the quantitative values after the conversion in the practical examples, respectively. Note that the repeated measurement result refers to a result acquired by continuously measuring the same sample 5 times.

On the other hand, the limes in samples 1 to 7 were quantified by the conventional calibration curve method. The Integrated intensities were calculated (repeatedly measured) and the calibration curve was prepared using the average value of the acquired integrated intensities. The quantitative analyses of samples 1 to 7 were performed using the calibration curve. FIGS. 9A to 9C are tables and graphs showing the integrated intensities (counts) acquired with the calibration curve method, the calibration curve used for the conversion into the content ratio, and the quantitative values after the conversion, respectively. In all the results, when the matrix components are the same, the quantitative results are acquired in accordance with the added amount.

The content ratios of lime were calculated for samples 1 to 7 by the Rietveld method. FIG. 10 is a table showing the quantitative values acquired by the Rietveld method. In the Rietveld method, since the difference between the added amount and the quantitative value is large due to the influence of an unidentified substance or the like, it can be seen that it is difficult to correctly evaluate the content ratio of the lime.

Comparison Between Practical Examples and Calibration Curve Methods Using Different Matrices In order to apply this method to the operation in a cement factory, it was confirmed that accurate quantitative analysis was possible even in samples with different matrix components. Here, the analysis results of the practical examples and the calibration curve method are compared when different matrices are used. Using cement standard sample 601A-1, 601A-2 for elemental analysis distributed by the Cement Association as matrices, samples 8 and 9 were prepared by mixing lime to 1% of the total, and quantitative analyses were performed on these samples using the calibration curves prepared in FIGS. 8B and 9B.

First, as the practical examples, the scale factors acquired by the WPPF method were converted into quantitative values using the calibration curve acquired by the WPPF method. All the scale factors are based on repeated measurements. FIGS. 11A and 11B are tables showing the scale factors acquired from samples 8 and 9, and the quantitative values after the conversion using the calibration curve.

Further, as a comparative example, the quantitative analyses of the lime in the respective samples were performed by the calibration curve method. FIGS. 12A and 12B are tables showing the integrated intensities (counts) acquired from samples 8 and 9, and the quantitative values after the conversion using the calibration curve. From these results, accurate quantitative analyses were possible even when the matrices were different in the practical examples. On the other hand, in the calibration curve method, the quantitative values were inaccurate when the matrices were different.

(Comparison Between Partial Accumulation Measurement and Normal Measurement)

In order to improve the accuracy of quantitative values of minute components efficiently, the measurements were carried out in the whole range (2θ=10-65°) and in the range containing the peaks of interest, respectively, and the X-ray diffraction profile was acquired (partial accumulation measurements). The X-ray diffraction profile was also acquired by measurement (normal measurement) under a single condition for the whole range as a comparison. The quantitative analysis results based on the respective examples were compared. In each of the cases, the total measurement time is 8 minutes. In the partial accumulation measurements, measurements in the whole range were taken over 4 min, and those in the (200) and (220) planes of the lime were taken over 4 min. In the normal measurement, the whole range was measured in 8 minutes.

FIG. 13 is a table showing the measurement results of the partial accumulation measurement and normal measurement. As shown in FIG. 13, in the case of the same measurement time, the quantification accuracy of the minute component can be improved more efficiently by the partial accumulation measurement than the normal measurement. In the used software (SLSII), σ is also taken into account when calculating with the least squares method. Therefore, the accuracy of the minute phase can be improved by reducing the statistical variation of the minute peak. The above experiment demonstrated the effect of partial accumulation measurement.

Incidentally, this application claims priority under Japanese Patent Application No. 2021-094383 filed on Jun. 4, 2021, and the entire contents of Japanese Patent Application No. 2021-094383 are incorporated in this application.

DESCRIPTION OF SYMBOLS

100 quantitative analysis system
200 X-ray diffraction apparatus
210 X-ray irradiation section
220 detector
300 processing apparatus
310 diffraction data storing section
320 WPPF section
325 scale factor acquiring section
330 standard sample information storing section
340 calibration curve generating section
350 calibration curve storing section
360 specification receiving section
370 conversion section
380 apparatus controlling section
A1 input device
A2 display device
400 cement manufacturing plant
410 raw material pulverizer
420 preheater
430 rotary kiln
440 cooler
450 cement pulverizer
480 manufacturing control system
485 control apparatus
S sample
P1 peak intensity
P2 peak intensity
P3 peak intensity

What is claimed is:

1. A quantitative analysis apparatus, comprising:
   a WPPF section for determining parameters of theoretical diffraction intensity by performing whole powder pattern fitting with respect to an X-ray diffraction profile to be analyzed,
   a scale factor acquiring section for acquiring a scale factor of a test component among the determined parameters,
   a calibration curve storing section for storing a calibration curve indicating a correlation between scale factors of the test component acquired with respect to a standard sample and content ratios of the test component in the standard sample, and
   a conversion section for converting the scale factor of the test component acquired with respect to an objective sample into the content ratio of the test component in the objective sample using the stored calibration curve.

2. The quantitative analysis apparatus according to claim 1, wherein
   a composite profile acquired by partially accumulating an X-ray diffraction profile of an angle range additionally measured with an X-ray diffraction profile of a whole angle range to be measured is used as the X-ray diffraction profile of the objective sample to be analyzed.

3. The quantitative analysis apparatus according to claim 1, further comprising
   a specification receiving section for receiving specification of conditions, wherein the calibration curve storing section stores a plurality of calibration curves corresponding to conditions, and the conversion section converts the scale factor of the test component acquired with respect to the objective sample into the content ratio of the test component in the objective sample using the calibration curve that conforms to the specified conditions among the stored calibration curves.

4. The quantitative analysis apparatus according to claim 3, wherein the condition is a type of the objective sample.

5. The quantitative analysis apparatus according to claim 3, further comprising a standard sample information storing section for storing measurement conditions to acquire the X-ray diffraction profile to be analyzed in measurement of the standard sample, transmitting the measurement conditions of the standard sample when acquiring the X-ray diffraction profile to be analyzed used for preparing the calibration curve that conforms to the condition from the standard sample information storing section to a control apparatus, and causing the control apparatus to perform measurement control of the objective sample in accordance with the transmitted measurement condition.

6. The quantitative analysis apparatus according to claim 1, wherein the converted content ratio of the test component is a content ratio of a quality indicator component of a product which is an extraction source of the objective sample.

7. The quantitative analysis apparatus according to claim 1, wherein the content ratio of the test component in the standard sample has been acquired by a titration method.

8. The quantitative analysis apparatus according to claim 1, wherein the scale factor acquiring section normalizes the scale factor of the test component acquired with respect to the standard sample with the integrated intensity of the maximum peak in the X-ray diffraction profile to be analyzed.

9. A manufacturing control system comprising:

the quantitative analysis apparatus according to claim 1, and a control apparatus for controlling manufacturing conditions of a product from which the objective sample is extracted.

10. A quantitative analysis method comprising following steps of:

determining parameters of theoretical diffraction intensity by performing whole powder pattern fitting with respect to an X-ray diffraction profile to be analyzed, acquiring a scale factor of a test component among the determined parameters, storing a calibration curve indicating a correlation between scale factors of the test component acquired with respect to a standard sample and content ratios of the test component in the standard sample, and converting the scale factor of the test component acquired with respect to the objective sample into the content ratio of the test component in the objective sample using the stored calibration curve.

11. A non-transitory computer readable recording medium having recorded thereon a quantitative analysis program causing a computer to execute following processes of:

determining parameters of theoretical diffraction intensity by performing whole powder pattern fitting with respect to an X-ray diffraction profile to be analyzed, acquiring a scale factor of a test component among the determined parameters, storing a calibration curve indicating a correlation between scale factors of the test component acquired with respect to a standard sample and content ratios of the test component in the standard sample, and converting the scale factor of the test component acquired with respect to the objective sample into the content ratio of the test component in the objective sample using the stored calibration curve.

* * * * *